N. WIARD.
Lock-Up Safety-Valves.
No. 157,050. Patented Nov. 17, 1874.
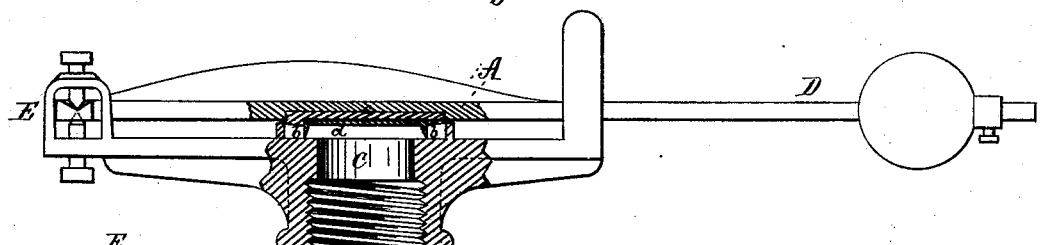
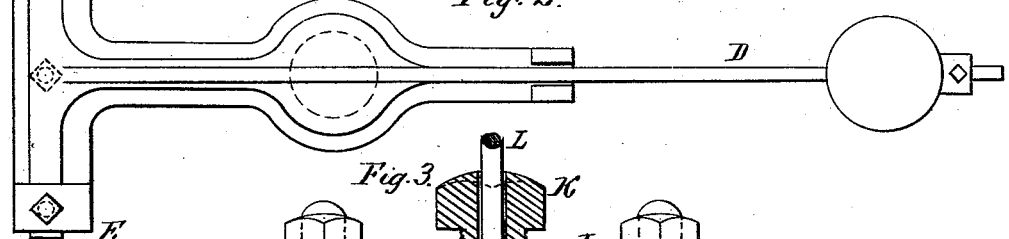
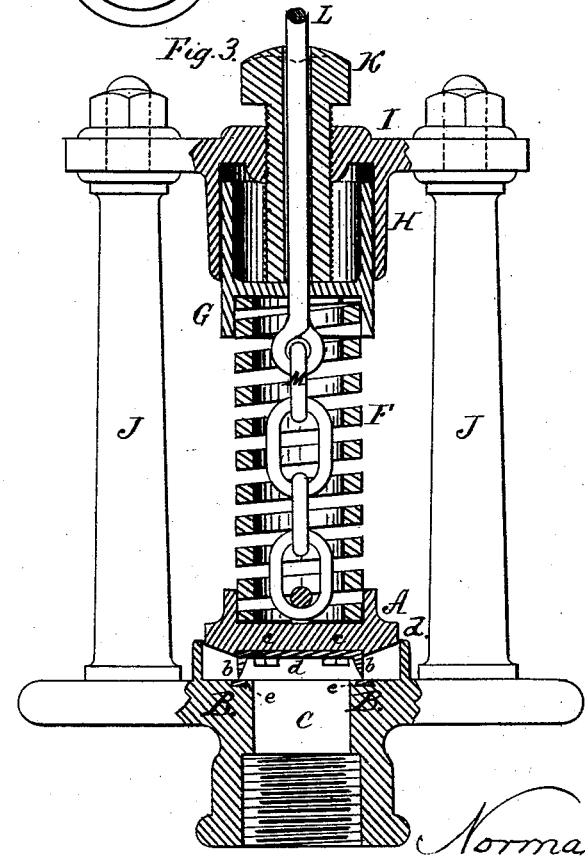
WITNESSES
Norman Wiard
INVENTOR
By James L. Norris,
Attorney

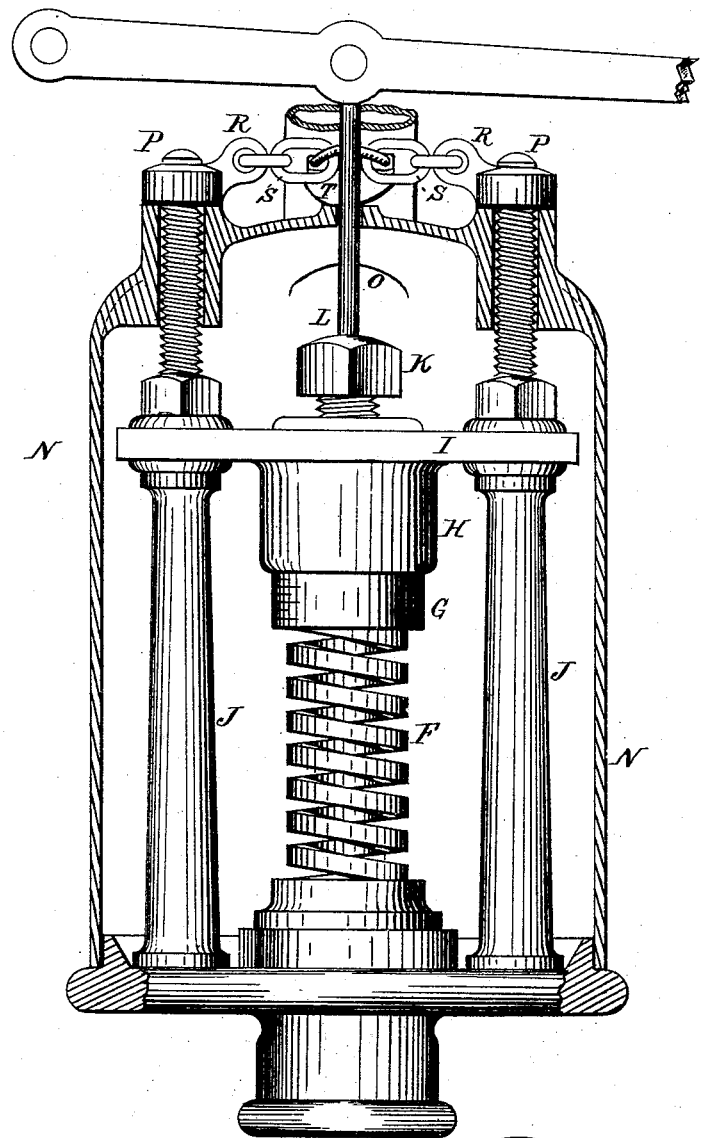

UNITED STATES PATENT OFFICE.

NORMAN WIARD, OF WASHINGTON, DISTRICT OF COLUMBIA.

IMPROVEMENT IN LOCK-UP SAFETY-VALVES.

Specification forming part of Letters Patent No. 157,050, dated November 17, 1874; application filed August 18, 1874.

*To all whom it may concern:*

Be it known that I, NORMAN WIARD, of Washington, in the District of Columbia, have invented certain new and useful Improvements in Lock-Up Safety-Valve, of which the following is a specification:

This invention relates to a new and improved safety-valve or lock-up safety-valve, which will be comparatively free from friction; and which is so constructed that there will be no rubbing or sticking, and which can therefore be always relied upon, and which cannot be injured by the grit or sand getting between the valve and its seat; and it consists, first, in certain improvements in the construction of the valve and its seat; second, in certain devices and combinations of the same, by means of which the valve and its seat, and the devices for keeping it against the seat, may be securely covered and locked to prevent any tampering with the same, as and for the purposes described.

In the drawings, Figure 1 represents a sectional view of a safety-valve constructed in part according to my invention. Fig. 2 is a top view of the same. Fig. 3 is a view, partly in section, of my invention prior to the application of the lock-up device; Fig. 4, a view of the same, partly in section, showing the lock-up device attached.

A represents the valve, and B the valve-seat. The valve consists of a circular disk, $d$, having an annular knife-edge, $b\ b$, on its under side, and set and firmly secured in a circular recess on the under side of a larger disk, $c$. The lower side of the larger disk is beveled from the edge of the smaller disk upward to its own edge, as shown. The valve-seat consists of an annular wall, $d$, formed around the escape-aperture C, of the same size in circumference as the larger disk of the valve, the escape-aperture being somewhat smaller than the knife-edge $b$, and having set around it an annular strip of metal, $e$, which falls directly under the knife-edge, and which may be removed and renewed when desired. The seat may be formed without this removable ring, however, if desired, as shown in Fig. 1. The valve, when seated, rests with the lower edge of the larger disk upon the annular wall $d$, and the knife-edge $b$ on the ring E $e$, or around the escape-aperture C leading from the boiler. The valve, as thus constructed, as will be perceived, has a limited bearing at two places all round upon the seat. These two bearings keep the valve securely seated, but occasion very little friction; and, the valve having the smallest possible bearing-surface, there is very little liability for it to stick or become fastened to the seat. Figs. 1 and 2 represent the valve as secured by means of the weighted lever D. Said lever is secured to its fulcrum at E E upon friction-points or knife-edges, so as to work with little friction. In other respects the lever is constructed in the same manner as the ordinary lever for this purpose. Fig. 4 represents the means of securing the valve upon its seat and the lock-up device for covering the valve and its springs. The valve is formed with a recess on its upper end, which receives and retains a strong spring, F, which holds the valve to its seat. The other end of said spring is held in a cylinder or plug, G, recessed on its under and upper sides, as shown, and sliding in a short sleeve, H, attached to a cross-bar, I, supported upon standards J J. Through the upper end of said sleeve passes a screw-bolt, K, bearing against the bottom of the recess in the cylinder or plug G, by means of which the pressure of the spring may be regulated. Said bolt is bored as shown, through which passes a rod, L, attached to a chain, M, attached to the valve B. This rod is secured at its upper end to a lever, by means of which the valve can be lifted from its seat when desired. The lock-up device consists of a dome or bell, N, provided with a suitable aperture, O, for the escape of steam, which is to be secured over the standard's spring-valve and valve-seat, as shown in Fig. 4, by means of screw-bolts P P, provided at their upper ends with keys R, securely attached thereto, which have attached to each a short chain, S, the ends of which may be locked together by means of a padlock, T, and prevent the screws from being turned and the dome N from being removed. The rod L passes up through an aperture in the top of the dome for the purpose, and is attached to the lever U in order that the valve may be lifted when desired.

What I claim as my invention, and desire to secure by Letters Patent, is—

1. The improved valve, having an annular knife-edge on its under side, and beveled off around said edge, as described, in combination with a valve-seat, consisting of an annular wall surrounding the bearing-surface on which the knife-edge is seated, as herein described.

2. The dome N, arranged over the valve and its attachments, in combination with the screw-bolts P, chains S S, and the lock T, the whole constructed for locking up the valve, substantially as and for the purposes described.

In testimony that I claim the foregoing I have hereunto set my hand.

NORMAN WIARD.

Witnesses:
ALBERT H. NORRIS,
JAMES L. NORRIS.